United States Patent [19]
Podszun et al.

[11] Patent Number: 5,932,152
[45] Date of Patent: Aug. 3, 1999

[54] PROCESS FOR PREPARING CROSSLINKED BEAD-FORM POLYMERS

[75] Inventors: Wolfgang Podszun; Olaf Halle, both of Köln; Werner Strüver, Leverkusen; Robert Bloodworth; Holger Lütjens, both of Köln, all of Germany

[73] Assignee: Bayer Aktiengesellschaft, Leverkusen, Germany

[21] Appl. No.: 09/055,657

[22] Filed: Apr. 6, 1998

[30] Foreign Application Priority Data

Apr. 10, 1997 [DE] Germany ............... 197 14 827

[51] Int. Cl.⁶ ............................................. C08F 4/32
[52] U.S. Cl. ..................... 264/4.1; 264/4.33; 264/4.7
[58] Field of Search .................. 264/4.1, 4.33, 264/4.7

[56] References Cited

U.S. PATENT DOCUMENTS

| | | | |
|---|---|---|---|
| 4,283,499 | 8/1981 | Howell | 521/38 |
| 4,419,245 | 12/1983 | Barrett et al. | |
| 4,427,794 | 1/1984 | Lange et al. | |
| 4,564,644 | 1/1986 | Harris. | |
| 5,047,438 | 9/1991 | Feibush et al. | 521/61 |
| 5,637,627 | 6/1997 | Watanabe et al. | 521/33 |

FOREIGN PATENT DOCUMENTS

| | | |
|---|---|---|
| 0 046 535 | 3/1982 | European Pat. Off. |
| 0 098 130 | 1/1984 | European Pat. Off. |
| 0 101 943 | 3/1984 | European Pat. Off. |
| 28 27 475 | 1/1979 | Germany. |
| 1 602 064 | 11/1981 | United Kingdom. |

OTHER PUBLICATIONS

"Polymerizations in Suspensions" by C.E. Schildknecht, published in 1956 by Interscience Publishers, Inc., New York, pp. 69–109.

*Primary Examiner*—Nathan M. Nutter
*Attorney, Agent, or Firm*—Joseph C. Gil; Richard E.L. Henderson

[57] ABSTRACT

Suspension polymers having high swellability have low contents of soluble fractions if aliphatic peroxy esters are used as polymerization initiators.

16 Claims, No Drawings

PROCESS FOR PREPARING CROSSLINKED BEAD-FORM POLYMERS

BACKGROUND OF THE INVENTION

The invention relates to a process which uses peroxy esters as polymerization initiators for preparing crosslinked bead-form polymers having high swellability and low contents of soluble fractions.

Ion exchangers having very uniform particle size (termed "monodisperse" below) have gained in importance in very recent times, since economic advantages can be achieved in many applications as a result of the more favourable hydrodynamic properties of an exchanger bed made from monodisperse ion exchangers. Monodisperse ion exchangers can be obtained by functionalizing monodisperse bead polymers.

One of the ways of preparing monodisperse bead polymers is the process known as seed/feed, in which a monodisperse polymer ("seed") is swollen in the monomer and this is then polymerized. Seed/feed processes are described, for example, in European Patent Specifications 98 130(U.S. Pat. No. 4,419,245) and 101 943(U.S. Pat. No. 4,564,644).

It is said that seed polymers should have a high swelling index, so that they can absorb a large amount of the monomer added during the seed/feed process. The swelling index (SwI) is the quotient obtained from the volume of the swollen polymer and the volume of the unswollen polymer. The swelling index can be controlled in a known manner through the content of crosslinker: low contents of crosslinker give high swelling indices and vice versa. Thus, for example, styrene polymers which are crosslinked using from 0.2 to 0.5% by weight of divinylbenzene have swelling indices of from 5 to 10 in toluene. However, seed polymers which have a low degree of crosslinking have a very high fraction of soluble polymers which are not crosslinked. This fraction of soluble polymers, which are not crosslinked, in the seed polymer is undesirable from many points of view:

1. The polymerization of the swollen seed may be impaired due to agglomerations of the particles with one another caused by polymer fractions dissolved out from the seed by the added monomer.
2. The functionalization for preparing the ion exchangers may be made more difficult because the polymer fractions which are dissolved out build up in the reaction solution used for functionalization.
3. The end products (ion exchangers) may contain increased amounts of soluble polymers, and this can lead to undesirable leaching of the ion exchangers.

The object of the present invention is to provide crosslinked bead-form polymers having high swellability and low contents of soluble fractions.

SUMMARY OF THE INVENTION

It has now been found that polymers having low contents of crosslinkers and correspondingly high swellability contain particularly low contents of soluble polymer fractions if peroxy esters have been used as initiators during their preparation.

The present invention provides a process for preparing crosslinked bead-form polymers, by suspension polymerization of a mixture of a) from 98.2 to 99.7, preferably from 98.6 to 99.6% by weight of monomer, b) from 0.1 to 0.8, preferably from 0.2 to 0.4% by weight of crosslinker and c) from 0.2 to 1.0% by weight of polymerization initiator, where the percentage data are based on the total of components a) to c), characterized in that at least one aliphatic peroxy ester is used as polymerization initiator c).

DETAILED DESCRIPTION OF THE INVENTION

For the purposes of the invention, monomers a) are compounds having a C=C double bond capable of free-radical polymerization in each molecule. Preferred compounds of this type include aromatic monomers, such as vinyl- and vinylidene derivatives of benzene and of naphthalene, e.g. vinylnaphthalene, vinyltoluene, ethylstyrene, α-methylstyrene, chlorostyrenes, preferably styrene, and also non-aromatic vinyl and vinylidene compounds, such as acrylic acid, methacrylic acid, $C_1$–$C_8$-alkyl acrylates, $C_1$–$C_8$ alkyl methacrylates, acrylonitrile, methacrylonitrile, acrylamide, methacrylamide, vinyl chloride, vinylidene chloride and vinyl acetate. The non-aromatic monomers are preferably used in subordinate amounts, preferably in amounts of from 0.1 to 50% by weight, in particular from 0.5 to 20% by weight, based on aromatic monomers. In most cases, however, use will be made exclusively of aromatic monomers.

Suitable crosslinkers b) are compounds which contain, in each molecule, two or more, preferably two to four, double bonds capable of free-radical polymerization. Examples are: divinylbenzene, divinyltoluene, trivinylbenzene, divinylnaphthalene, trivinylnaphthalene, diethylene glycol divinyl ether, 1,7-octadiene, 1,5-hexadiene, ethylene glycol dimethacrylate, triethylene glycol dimethacrylate, trimethylolpropane trimethacrylate, allyl methacrylate and methylene-N,N'-bisacrylamide. Divinylbenzene is preferred as crosslinker. Commercial qualities of divinylbenzene, which contain ethylvinylbenzene as well as the isomers of divinylbenzene, are adequate for most applications.

Aliphatic peroxy esters c) have the formulae I, II or III

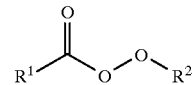

Formula I

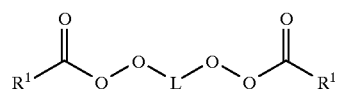

Formula II

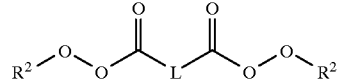

Formula III where $R^1$ is an alkyl radical having from 2 to 20 carbons atoms or a cycloalkyl radical having up to 20 carbon atoms, $R^2$ is a branched alkyl radical having from 4 to 12 carbon atoms and L is an alkyl radical having from 2 to 20 carbon atoms or a cycloalkylene radical having up to 20 carbon atoms.

Examples of preferred aliphatic peroxy esters of formula I are tert-butyl peroxyacetate,
tert-butyl peroxyisobutyrate,
tert-butyl peroxypivalate, tert-butyl peroxyoctoate,
tert-butyl peroxy-2-ethylhexanoate,
tert-butyl peroxyneodecanoate,
tert-amyl peroxyneodecanoate,
tert-amyl peroxypivalate,
tert-amyl peroxyoctoate,
tert-amylperoxy-2-ethylhexanoate and
tert-amyl peroxyneodecanoate.

Examples of preferred aliphatic peroxy esters of formula II are
2,5-bis(2-ethylhexanoylperoxy)-2,5-dimethylhexane,
2, 5-dipivaloyl-2,5-dimethylhexane and 2,5-bis(2-neodecanoylperoxy)-2,5-dimethylhexane.

Examples of preferred aliphatic peroxy esters of formula III are
di-tert-butyl peroxyazelate and
Di-tert-amyl peroxyazelate.

The term suspension polymerization is taken to mean a process in which a monomer phase which contains an initiator soluble in the monomer is distributed as droplets in a phase which is essentially immiscible with the monomer, and the monomer is cured by increase of temperature, with stirring. Further details of suspension polymerization are described, for example, in the publication Polymer Processes, edited by C. E. Schildknecht, published in 1956 by Interscience Publishers, Inc. New York, in the chapter "Polymerization in Suspension" on pages 69–109. In the case of the present invention, the phase which is essentially immiscible with the monomer is preferably an aqueous phase.

In a particular embodiment of the present invention, the mixture of vinylaromatic a), crosslinker b) and aliphatic peroxy ester c) is microencapsulated.

Possible materials for the microencapsulation are those known for this purpose, in particular polyesters, naturally occurring and synthetic polyamides, polyurethanes and polyureas. A particularly suitable naturally occurring polyamide is gelatin. This is used in particular in the form of a coacervate and complex coacervate. For the purposes of the invention, gelatin-containing complex coacervates are taken to mean particularly combinations of gelatin and synthetic polyelectrolytes. Suitable synthetic poly-electrolytes are copolymers incorporating units of, for example, maleic acid, acrylic acid, methacrylic acid, acrylamide or methacrylamide. Gelatin-containing capsules may be hardened using conventional hardening agents, such as formaldehyde or glutaric dialdehyde. European Patent Specification 46 535 describes in detail the encapsulation of monomer droplets using, for example, gelatin, gelatin-containing coacervates and gelatin-containing complex coacervates. The methods for encapsulation using synthetic polymers are known per se. An example of a very suitable method is interfacial condensation, in which a reactive component (e.g. an isocyanate or an acid chloride) dissolved in the monomer droplet is reacted with a second reactive component (e.g. an amine) dissolved in the aqueous phase.

The mean particle size of the encapsulated or non-encapsulated monomer droplets is from 10 to 1000 $\mu$m, preferably from 100 to 1000 $\mu$m.

The novel process is also very suitable for preparing monodisperse bead-form polymers, in particular those of European Patent Specification 46 535. (U.S. Pat. No. 4,457, 794) the aqueous phase then expediently contains one or more protective colloids. Preferred protective colloids are naturally occurring and synthetic water-soluble polymers, such as gelatin, starch, polyvinyl alcohol, polyvinylpyrrolidone, polyacrylic acid, polymethacrylic acid and copolymers made from (meth)acrylic acid and (meth)acrylates. Other very suitable materials are cellulose derivatives, in particular cellulose esters and cellulose ethers, such as methylhydroxyethylcellulose, methylhydroxypropylcellulose, hydroxy-ethylcellulose and carboxymethylcellulose. Gelatin is particularly suitable as protective colloid for polymerizing monomer droplets encapsulated with gelatin or gelatin-containing complex coacervates. The amount of the protective colloids used is generally from 0.02 to 1% by weight, preferably from 0.05 to 0.3% by weight, based on the aqueous phase. The aqueous phase may moreover contain a buffer system. Preference is given to buffer systems which set the pH of the aqueous phase at the start of the polymerization to between 14 and 6, preferably between 12 and 8. Under these conditions, protective colloids having carboxylic acid groups are present partly or entirely as salts. This has a favourable effect on the action of the protective colloids. Particularly suitable buffer systems contain phosphate salts or borate salts. For the purposes of the invention, the terms phosphate and borate also include the condensation products of the ortho forms of corresponding acid and salts. The concentration of phosphate and/or borate in the aqueous phase is from 0.5–500 mmol/l, preferably from 5–100 mmol/l.

The aqueous phase may moreover contain a dissolved polymerization inhibitor. Possible inhibitors are either inorganic or organic substances. Examples of inorganic inhibitors are transition metal salts, such as copper(II) chloride, copper(II) sulphate, iron(III) chloride, iron(II) sulphate, manganese(II) chloride and nitrogen compounds, such as hydroxylamine, hydrazine, sodium nitrite and potassium nitrite. Examples of organic inhibitors are phenolic compounds, such as hydroquinone, hydroquinone monomethyl ether, resorcinol, pyrocatechol, tert-butylpyrocatechol and condensation products of phenols with aldehydes. Other organic inhibitors are nitrogen-containing compounds, such as diethylhydroxylamine and isopropylhydroxylamine. The concentration of the inhibitor is from 5 to 1000 ppm, preferably from 10 to 500 ppm, particularly preferably from 20 to 250 ppm, based on the aqueous phase.

The volume ratio of monomer phase to aqueous phase is generally from 1:0.75 to 1:20, preferably from 1:1 to 1:6.

The polymerization temperature depends on the decomposition temperature of the initiator used. It is generally from 50 to 150° C., preferably from 55 to 100° C. The polymerization takes from 0.5 hours to a few hours. It has proven useful to use a temperature programme, beginning the polymerization at low temperature, e.g. 70° C., and increasing the reaction temperature as the conversion in the polymerization advances.

After the polymerization, the polymer may be isolated by conventional methods, e.g. by filtering or decanting, and, if desired, be dried after one or more washes.

The invention is not suggested by the prior art: European Patent Specification 98 130(U.S. Pat. No. 4,419,245) recommends crosslinker amounts of from 0.1 to 3% by weight, but dibenzoyl peroxide is used as polymerization initiator in the examples. European Patent Specification 101 943(U.S. Pat. No. 4,564,644) recommends crosslinker amounts of from 0.05 to 12.5% by weight, but tert-butyl peroxybenzoate is used in the examples.

German Patent Specification 2 827 475 claims the use of peroxy esters or peroxy carbonates as initiator for preparing ion exchangers having improved resistance to pressure. However, this text does not recommend the use, as seed for seed/feed polymers, of polymers prepared using aliphatic peroxy esters. It has hitherto appeared impossible to prepare polymers which have a low degree of crosslinking and a very low content of extractable constituents.

The invention therefore also provides crosslinked polymers having a swelling index of from 5 to 10 (measured in toluene; identical swelling indices are obtained using styrene) and a content of soluble fraction (measured by tetrahydrofuran extraction) of less than 5% by weight.

The present invention will be further illustrated in the following non-limiting examples.

EXAMPLES

Soluble Contents

In order to determine the soluble contents 5–7 g of a bead polymer were introduced into an extraction thimble and extracted overnight in a Soxhlet extractor with 800 ml of toluene (bath temperature: 140° C.). The extract was filtered through a nutsch filter containing a black band filter and concentrated in a rotary evaporator to approx. 1 ml. Then 300 ml of methanol were added and the mixture was dried in vacuo in the rotary evaporator until the weight was constant. Two tests were carried out on each sample.

Swelling

The swelling of the bead polymers was examined in toluene and in some cases additionally in THF and styrene at room temperature. For this purpose 10 ml of a dried, screened bead polymer were introduced into a 100 ml glass jar. The quotient of the volume of the bed of material ($V_0$) and the quantity introduced ($m_0$) was the bulk volume ($V_{bulk}$). The glass jar was filled with the swelling agent to 100 ml and left to stand for 10–20 hours, during which the jar was shaken frequently, while ensuring that any air bubbles which formed were able to escape. The volume of the swollen bed of material was read off and was $V_1$. According to the definition the quotient of $V_1$ and $V_0$ is the volume swelling index (SwI).

Example 1 (Comparative Example)

10 g of disodium hydrogenphosphate decahydrate, 0.03 g of sodium nitrite and 3 g of methylcellulose (Tylose MH 50) are dissolved in 1500 ml of deionized water in a 3 l glass reactor. A mixture of x g of styrene, y g of commercial divinylbenzene (80% divinylbenzene, 20% ethylstyrene) and 5 g of dibenzoyl peroxide (100% strength) is added, with stirring at 350 rpm. A stream of nitrogen is introduced into the reaction vessel at 20 l/h. The mixture is held firstly at 75° C. for 10 hours and then at 95° C. for 1 hour, and is then cooled to room temperature. The solid is isolated with the aid of a screen (50 μm aperture size), washed several times with water and dried at 75° C. in a drying cabinet. This gives 950 g of bead polymer having a mean particle size of about 250 μm.

The swelling index is determined at 25° C. in toluene. The soluble fractions are determined by extracting with tetrahydrofuran in a Soxhlet extractor for 6 hours.

|    | Amount of styrene (x) | Amount of DVB (y) | SwI | Soluble fractions |
|----|-----------------------|-------------------|-----|-------------------|
| 1A | 997 g                 | 3 g               | 9.5 | 16.8%             |
| 1B | 996 g                 | 4 g               | 7.8 | 14.5%             |
| 1C | 995 g                 | 5 g               | 6.9 | 10.5%             |

Example 2 (According to the Invention)

Example 1 is repeated but using tert-butyl peroxy-2-ethylhexanoate instead of dibenzoyl peroxide. This gives 955 g of bead polymer having a mean particle size of about 250 μm.

|    | Amount of styrene (x) | Amount of DVB (y) | SwI | Soluble fractions |
|----|-----------------------|-------------------|-----|-------------------|
| 2A | 998 g                 | 2 g               | 8.6 | 4.5%              |
| 2B | 997 g                 | 3 g               | 7.7 | 3.7%              |
| 2C | 996 g                 | 4 g               | 7.1 | 2.5%              |

Example 3 (According to the Invention)

Example 1 is repeated but using 2,5-bis(2-ethylhexanoylperoxy)-2,5-dimethylhexane instead of dibenzoyl peroxide. This gives 950 g of bead polymer having a mean particle size of about 250 μm.

|   | Amount of styrene (x) | Amount of DVB (y) | SwI | Soluble fractions |
|---|-----------------------|-------------------|-----|-------------------|
| 3 | 997.5 g               | 2.5 g             | 7.8 | 4.4%              |

Examples 2 and 3 according to the present invention show significant low soluble fractions over that of the prior art while providing a swelling index values that is almost the same as the prior art.

It will be understood that the specification and examples are illustrative but not limitative of the present invention and that other embodiments within the spirit and scope of the invention will suggest themselves to those skilled in the art.

We claim:

1. A process for preparing a crosslinked bead-form polymer comprising suspension polymerizing a microencapsulated mixture of a) from 98.2 to 99.7% by weight of a monomer having a C=C double bond capable of free-radical polymerization, b) from 0.1 to 0.8% by weight of a crosslinker having two or more double bonds capable of free-radical polymerization, and c) from 0.2 to 1.0% by weight of at least one aliphatic peroxy ester polymerization initiator.

2. Process according to claim 1, in which the polymers are prepared from a) from 98.6 to 99.6% by weight of monomer, b) from 0.2 to 0.4% by weight of crosslinker and c) from 0.2 to 1.0% by weight of polymerization initiator.

3. Process according to claim 1, in which the aliphatic peroxy ester has the formula I, II or III

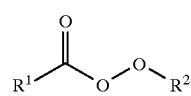

Formula I

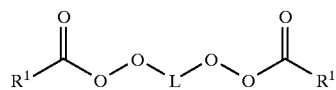

Formula II

Formula III

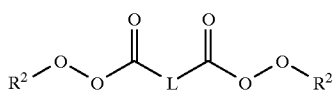

where
- $R^1$ is an alkyl radical having from 2 to 20 carbons atoms or a cycloalkyl radical having up to 20 carbon atoms,
- $R^2$ is a branched alkyl radical having from 4 to 12 carbon atoms and
- L is an alkyl radical having from 2 to 20 carbon atoms or a cycloalkylene radical having up to 20 carbon atoms.

4. A process according to claim 3, wherein the peroxy ester is at least one selected from the group consisting of tert-butyl peroxyacetate, tert-butyl peroxyisobutyrate, tert-butyl peroxypivalate, tert-butyl peroxyoctoate, tert-butyl peroxy-2-ethylhexanaote, tert-butyl peroxyneodecanoate, tert-amyl peroxyneodecanoate, tert-amyl peroxypivalate, tert-amyl peroxyoctoate, tert-amylperoxy-2-ethylhexanaote and tert-amyl peroxyneodecanoate.

5. A process according to claim 3, wherein the peroxy ester is at least one selected from the group consisting of 2,5-bis(2-ethylhexanoylperoxy)-2,5-dimethylhexane, 2,5-dipivaloyl-2,5-dimethylhexane, 2,5-bis(2-neodecanoylperoxy)-2,5-dimethylhexane, di-tert-butyl peroxyazelate and di-tert-amyl peroxyazelate.

6. A process according to claim 1, in which the monomers of a) are at least one selected from the group consisting of vinyl and vinylidene derivatives of benzene and naphthalene, and non-aromatic vinyl and vinylidene compounds.

7. A process according to claim 1, in which the monomers of a) are at least one selected from the group of vinylnaphthalene, vinyltoluene, ethylstyrene, α-methylstyrene, chlorostyrene, ortho-chloromethylstyrene, m-chloromethylstyrene, p-chloromethylstyrene, and styrene.

8. A process according to claim 1, wherein the monomer a) further includes up to 50% by weight of at least one non-aromatic vinyl or vinylidene monomer polymerizable monomer selected from the group consisting of acrylic acid, methacrylic acid, $C_1$–$C_8$-alkyl acrylates, $C_1$–$C_8$-alkyl methacrylates, acrylonitrile, methacrylonitrile, acrylamide, methacrylamide, vinyl chloride, vinylidene chloride, and vinyl acetate.

9. A process according to claim 8, wherein the non-aromatic monomers are used in an amount ranging from about 0.5 to about 20% by weight based on the aromatic monomers.

10. A process according to claim 1, wherein the crosslinker is at least one selected from the group consisting of divinylbenzene, divinyltoluene, trivinylbenzene, divinylnaphthalene, trivinylnaphthalene, diethylene glycol divinyl ether, 1,7-octadiene, 1,5-hexadiene, ethylene glycol dimethacrylate, triethylene glycol dimethylacrylate, trimethylolpropane trimethacrylate, allyl methacrylate and methylene-N,N'-bisacrylamide.

11. A process according to claim 10, wherein the crosslinker is divinylbenzene.

12. A process according to claim 1, wherein the microencapsulation is undertaken utilizing a material of at least one of gelatin and synthetic polyelectrolites which are copolymers incorporating units of maleic acid, acrylate acid, methacrylate acid, acrylamide or methacrylamide, and wherein the mean particle size of the encapsulated monomer droplets is from 10 to 1,000 μm.

13. A process according to claim 1, which further includes from about 0.0 to 1% by weight of protective colloid.

14. A process according to claim 1, which further includes from about 5 to about 1,000 ppm of a polymerization inhibitor.

15. A process according to claim 12, which further includes a buffer system to maintain the pH of the aqueous phase at the start of polymerization at between a pH from about 14 to about 6.

16. Crosslinked polymers having a swelling index of from 5 to 10 (measured in toluene) and a content of soluble fractions (measured by tetrahtydrofuran extraction) of less than 5% by weight which are prepared using the process of claim 1.

* * * * *